Feb. 17, 1931. E. BREITLING 1,792,569
DIFFERENTIAL MECHANISM FOR CASH REGISTERS AND CALCULATING MACHINES
Filed Feb. 7, 1928
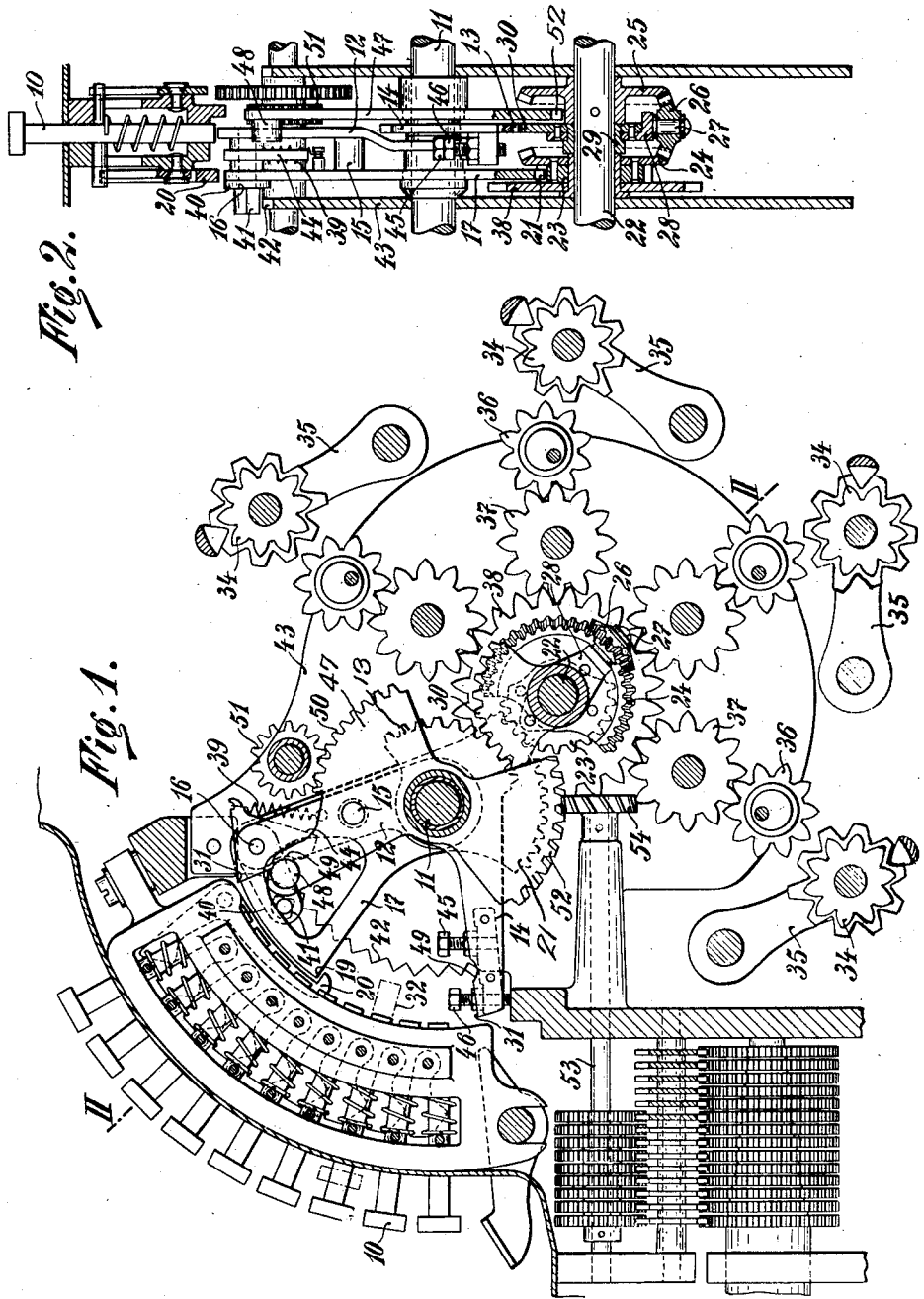

Patented Feb. 17, 1931

1,792,569

UNITED STATES PATENT OFFICE

ERNST BREITLING, OF ESSEN, GERMANY, ASSIGNOR TO FRIED. KRUPP AKTIENGESELLSCHAFT, OF ESSEN-ON-THE-RUHR, GERMANY

DIFFERENTIAL MECHANISM FOR CASH REGISTERS AND CALCULATING MACHINES

Application filed February 7, 1928, Serial No. 252,597, and in Germany June 16, 1927.

The invention relates to differential mechanisms intended for cash registers and calculating machines and belonging to that type, in which a differentially actuated chief member and a differentially actuated auxiliary member actuated complementarily thereto co-operate with a row of keys.

In machines of this type the revolution of the actuating motion, the amount of which is the same in every differential motion, into the differential amount and the complementary differential amount is effected by means of a differential gear. In known mechanisms of this design the actuating motion is introduced by the planet wheel of this differential gear, the two sun wheels of the gear being moved in the same direction. This arrangement has the disadvantage that the two differentially actuated members are moved from the same side toward the stop face of the set key, unless a reversing gear is interposed for one of these two differentially actuated members. By this reversing gear the clearance of the mechanism is however increased and the setting is made inaccurate.

Now the invention has for its object to obviate this drawback, which object is attained by having the differentially actuated chief member positively connected to one of the two sun wheels of the differential gear, and the auxiliary differential member to the planet wheel carrier or vice-versa, the actuating motion being introduced by the other sun wheel of the differential gear.

In order that the invention may be more easily understood, a preferred embodiment of same is illustrated in the drawing which accompanies and forms part of this specification. In this drawing:

Figure 1 is a side elevation of the differential mechanism, the differentially actuated members of which are mounted for rocking motion, and Figure 2 is a section on line II–II of Figure 1.

Referring to these figures, 11 denotes a shaft relatively to which the keys 10 are arranged concentrically. The differentially actuated chief member, arm 12, and the differentially actuated auxiliary member, arm 14, are rockingly mounted on shaft 11. By means of bolts 15, 16 the differential member 12 is rigidly connected to a segment 17, which co-operates by means of a nose 19 with a zero stop pawl 20 influenced by the keys, and is held in zero position if none of the keys 10 has been depressed. On its opposite side the segment 17 carries a toothed arc 21 in mesh with a pinion 23 loose on a shaft 22. Pinion 23 is rigidly connected to a bevel wheel 24 that constitutes one of the sun wheels of the differential gear, the other sun wheel of which is bevel wheel 25, see Figure 2, rigid on shaft 22. Both wheel 24 and wheel 25 are in mesh with the planet wheel of the differential gear, viz. bevel wheel 26 loosely rotatable on a journal 27 of the planet wheel carrier 28. The latter is rotatably mounted on shaft 22 by a hub 29, Figure 2, and is rigidly connected to a toothed segment 30 in mesh with a series of teeth 13 of the auxiliary differential-member 14. Each of the members 12 and 14 has a nose 31, Figure 1, co-operating with the foot 32 of the key 10 just depressed.

In each operation of the machine the shaft 22 has imparted to it a partial to and fro rotation of equal amplitude. This rotation is transmitted by bevel wheel 25 to planet wheel 26 and by the latter to carrier 28 and bevel wheel 24. When this takes place, said two latter elements move opposite one another and rock, during the forward rotation of shaft 22, the differential members 12, 14 connected to them from both sides toward the foot 32 of the depressed key, while they return them to initial position upon the shaft 22 turning backward, the planet wheel 26 of the differential gear 24, 25, 26 rolling on bevel wheel 24 and imparting to the carrier 28 an angular velocity which is half that of the actuating wheel 25, if the differential member 12 is stopped. If, on the contrary, it is the auxiliary differential member 14 that is stopped, then the planet wheel 26 rotates on journal 27 which is then stationary, the same but oppositely directed rotation being imparted to bevel wheel 24, as that of the actuating wheel 25.

In order to maintain the angular velocities of the differential members 12, 14 equal, this being required to have equal totals of the differential paths of these members in each differential operation of the machine, a corresponding ratio of transmission is provided between the differentially actuated members and the differential gear. In the embodiment illustrated the pitch circle diameter of the series of teeth 13 and 30 are equal to one another, while the pitch circle diameter of the toothed arc 21 is double that of the toothed arc 23. By arranging the differential gear on a separate shaft 22, a convenient lodgement of the transmission gearing is provided and, besides, more room is obtained to lodge the totalizers of the machine.

These totalizers 34 are mounted on swing frames 35 and co-operate by means of intermediate wheels 36, 37 with a common differentially actuated wheel 38 rigid on bevel wheel 24. As bevel wheel 24 is in positive connection with the differential member 12, the differential adjustment of the totalizers takes place in accordance with the motion of this member 12.

The described differential mechanism is further provided with an arrangement intended to lock the chief differential member 12 in adjusted position. To this end a catch 40, urged by a spring 39, is pivoted on pin 16. The catch 40 co-operates by means of its V-shaped lateral lug 41 with a series of stop teeth 42 arranged on a stationary partition 43. Catch 40 has connected to it an arm 44 projecting into the path of an adjustable lug formed by the set screw 45 mounted on the auxiliary differential member 14.

When in the differential motion of the members 12 and 14 the lug 45 strikes arm 44, which occurs, when the noses 31 are in immediate proximity of the foot of the depressed key, catch 40 is rocked against the action of spring 39, so that its lateral lug 41 engages that space which is just opposite to it of the stop teeth 42. In this manner the chief differential member 12 is exactly positioned in its differential position and locked therein. The advantage afforded by this arrangement resides in the fact, that the parts in consideration may operate with a certain clearance and need not to have dimensions of highest exactness. A set screw 46 arranged on the auxiliary differential member 14 serves to exactly adjust the differential members in initial position.

To position the type wheel and the indicating wheel in accordance with the introduced value, an arm 47 is rockingly mounted on shaft 11 beside the auxiliary differential member 14, Figure 2. A lateral pin 48 of arm 47 co-operates with correspondingly shaped recesses 49 of the members 12 and 14, Figure 1. Arm 47 carries a series of teeth 50, Figure 1, engaged by a pinion 51 that leads to the appurtenant indicating wheel (not shown), and helical teeth 52 in mesh with a helical wheel 54 fast on a shaft 53. The latter carries the type wheel (not shown) allotted to the respective order of the differential mechanism. This arrangement enables the type wheel and the indicating wheel to be immediately set from the old position to the new one and to remain in this new position in the following state of rest of the machine, during which state the differential members 12, 14 are in initial position.

At the commencement of the operation of the machine the lateral pin 48 is in a position between the two recesses 49 corresponding to the adjustment of the indicating wheel and type wheel caused by the preceding operation of the machine.

Now, when the two differential members 12, 14 are moved with their noses 31 in the described manner against the foot 32 of the depressed key 10, one of them takes with it the pin 48, until the latter is enclosed by the two recesses 49 in a tong-like manner at the end of the adjusting motion and arrives opposite the depressed key. After the indicating wheel and type wheel have then been locked in any known manner in their new position and the selected totalizers have been thrown into gear, the return rocking motion of shaft 22 takes place, whereby the differential members 12, 14 are returned to initial position shown in Figure 1 and the introduced value is transmitted to the selected totalizers.

The arm 47 and the indicating wheels and type wheels positively connected thereto remain in the adjusted position. If no key had been depressed in the respective order of the differential mechanism, the chief differential member 12 remains locked in initial position by pawl 20, so that the entire actuating motion of shaft 22 is transmitted to the auxiliary differential member 14. In this case the indicating and type wheels are set to zero, while a positioning of the respective counting wheel does not take place.

What I claim and desire to secure by Letters Patent, is:—

1. In a machine of the class described the combination with a pair of complementarily movable differential members pivotally mounted on a shaft, a driving member, a planet gear mechanism adapted to resolve the movement of the driving member into two complementary amounts destined for said differential members, respectively, said planet gear mechanism being pivotally mounted on a second shaft extending in parallel to said first-named shaft.

2. In a machine of the class described the combination according to claim 8, in which said connections consist of gearings on said last named sun wheel and said carrier, the ratio of transmission of said gearings being so chosen as to produce an equal angular velocity of each differential member with a certain driving movement of the driving shaft.

3. In a machine of the class described the combination with a pair of complementarily movable differential members, of a single device for adusting and locking both differential members in adusted position, connections arranged between said device and the differential members and adapted to cause said device to be actuated as both differential members approach their adusted position.

4. In a machine of the class described the combination with a pair of complementarily movable differential members, of a series of stop teeth fixed to the frame of the machine, a catch pivoted on one of said differential members and adapted to cooperate with said stop teeth, a lug fixed on the other differential member and adapted to so cooperate with said catch, that the latter is brought into mesh with said stop teeth upon the differential members being about to reach their adjusted position.

5. In a machine of the class described, a pair of complementarily movable differential members, an element mounted for bodily and rotational movement, positive connections whereby the bodily movement of said element is transmitted to one of said differential members, positive connections whereby the rotational movement of said element is transmitted to the other of said differential members, a driving member for said element having a constant extent of motion for each operation of the machine, said element adapted to resolve said constant extent of motion of said driving member into variable but complementary bodily and rotational movements.

6. In a machine of the class described, a pair of complementarily movable differential members, an element mounted for bodily and rotational movement, positive connections whereby the bodily movement of said element is transmitted to one of said differential members, positive connections whereby the rotational movement of said element is transmitted to the other of said differential members, a driving member having a constant extent of motion adapted to directly impart said rotational movement to said element, said element adapted to resolve the constant extent of motion of said driving member into variable but complementary bodily and rotational movements.

7. In a machine of the class described, a pair of differential members, a driving member having a constant extent of motion, and mechanism for resolving the motion of said driving member into variable but complementary motions of said differential members, comprising planetary gearing consisting of two sun wheels and a planet wheel, connections between one sun wheel and said driving member, connections between the other sun wheel and one of said differential members, and connections for transmitting bodily movements of said planet wheel to the other differential member.

8. In a machine of the class described, the combination of a shaft, a pair of complementarily movable differential members rotatably mounted on said shaft, a driving shaft, a planet gear mechanism mounted on said driving shaft comprising two sun wheels and a planet wheel, one of said sun wheels being fixed to said driving shaft, positive connections between the other sun wheel and one of said differential members, a carrier on which said planet wheel is mounted, and positive connections between said carrier and the other differential member.

The foregoing specification signed at Cologne, Germany, this 19th day of January, 1928.

ERNST BREITLING.